United States Patent Office 3,010,939
Patented Nov. 28, 1961

---

3,010,939
DINITROPHENYL HYDRAZONES AS AGE-RESISTANT IN COMPOUNDED HIGH POLYMER PRODUCTS
Kornelius Dinbergs, Cleveland, Ohio, assignor to The B. F. Goodrich Company, New York, N.Y., a corporation of New York
No Drawing. Filed Nov. 25, 1959, Ser. No. 855,260
1 Claim. (Cl. 260—45.9)

The present invention relates to a new class of age resisters for resinous high polymers to provide protection against the deteriorating effects of heat, light, and weathering. More particularly this invention is concerned with the use of dinitrophenyl hydrazones as age resisters in compounded high polymer products.

The search for new, more effective age resisters for natural and synthetic rubbers, and synthetic resins which are produced in sheet, film, fiber and molded forms, is a never-ending one. Articles which are exposed to the deteriorating effects of weather tend to stiffen, discolor, surface crack, check or craze, and lose appreciable amounts of their physical strength in relatively short periods of time.

It is an object of this invention to provide high polymer compounds which are exceptionally resistant to deterioration by light and weather.

It is another object of this invention to provide a class of age resister materials that can be readily compounded into a wide variety of natural and synthetic high polymer materials and that will invest said polymers with outstanding properties of age and deterioration resistance.

A further object is to provide high polymer materials compounded with 2,4-dinitrophenyl hydrazones which are suitable for forming fibrous, sheet, film, molded, cast and other solid objects that are extremely resistant to deterioration by heat, light and weather. Light, particularly ultra violet light with a wavelength of 300–400 m$\mu$, is one of the most destructive forces in the electromagnetic spectrum. It tends to degrade polymeric materials by discoloration, surface cracking, embrittlement and physical weakening by loss of tensile strength. Heat, on the other hand, literally boils and vaporizes many compounding ingredients right out of the polymer. Weathering produces ozone cracks, and sun checks, and fosters bleeding and leaching of both physically and chemically bound deterioration retarders and other compounding ingredients. The net effect is to leave articles composed of, or containing, high polymer parts severely discolored, cracked, stiff and weak in relatively short periods of time.

I have discovered that nitrophenyl hydrazones are strikingly effective in protecting high polymer materials, from the stiffening, cracking and staining effects of aging and weathering. Hydrazones are defined as condensation products containing the trivalent —NH.N:C= group, resulting from the action of compounds containing —N.NH$_2$ (hydrazines) with compounds containing

(aldehydes and ketones). More particularly, I find that 2,4-dinitrophenyl hydrazones are extremely effective when compounded in high polymer stocks to inhibit the deteriorating effects of weathering such as surface degradation, stiffening and embrittlement. Most preferred of my new deterioration retarders are 2,4-dinitrophenyl hydrazones formed by combining 2,4-dinitrophenyl hydrazine in equimolar proportions with a compound containing a reactive carbonyl,

group. Included in the groups of compounds containing a reactive

group are the chemical families of the aldehydes and ketones, including the so-called sugar aldehydes (aldoses).

The hydrazones contemplated for use in this invention include those within the general formula

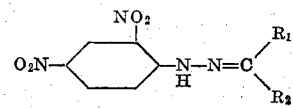

where $R_1$ is hydrogen, an alkyl radical preferably containing 1 to 15 carbon atoms, aryl, or aralkyl, and $R_2$ is hydrogen, an alkyl radical preferably containing 1–15 carbon atoms, an alkene radical containing ethylenic unsaturation (such as vinyl, allyl, or methallyl), and up to 9 carbon atoms, an aryl radical containing from 1 to 3 structural rings of carbon atoms or the reaction product of an aldose sugar with either a monoisocyanate or a diisocyanate. It is also understood that any of the before-listed structures for $R_1$ and $R_2$, with the exception of hydrogen itself, may have any reactive hydrogen replaced by another substituent group such as halogen, nitro, hydroxyl, carboxyl, or cyano and alkoxy or alkyl radicals containing from 1 to 4 carbon atoms. These materials are readily prepared by reacting 2,4-dinitrophenyl hydrazine with the proper carbonyl compound to give the desired phenyl hydrazone. In the formula above the element

comes from the carbonyl moiety of the reactants and the portion

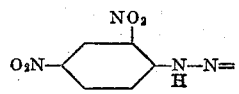

comes from the dinitrophenyl hydrazine.

When a sugar compound such as glucose is employed to prepare the dinitrophenyl hydrazone, it has been found advantageous to further react some of the available hydroxy groups with a material such as metaphenylene diisocyanate or phenylisocyanate to improve solubility in the high polymer stock.

The 2,4-dinitrophenyl hydrazones employed in the practice of my invention may be prepared by reacting 2,4-dinitrophenyl hydrazine with the desired carbonyl compound as described at page 171 in "The Systematic Identification of Organic Compounds." third edition, by Shriner and Fuson, John Wiley and Sons, Inc., 1948. A typical preparation is to mix 0.4 gram of 2,4-dinitrophenyl hydrazine in 2 ml. concentrated sulfuric acid and then add 3 ml. of water dropwise with stirring until solution is complete. Ten ml. of 95% ethanol are added. Dissolve 0.5 gram of the selected carbonyl compound in 20 ml. of 95% ethanol. Add the fresh 2,4-dinitrophenyl hydrazine solution and let the mixture stand at room temperature. The 2,4-dinitrophenyl hydrazone will usually crystallize in 5 to 10 minutes. If there is no precipitate in a short while, allow the mixture to stand overnight. The precipitate is readily separated by filtration.

The amount of 2,4-dinitrophenyl hydrazone that must be added to a polymeric material to provide adequate deterioration resistance varies somewhat depending on the composition of the base polymer employed. Proper amounts for any given polymeric material can readily be found by using regular mixing and compounding techniques for the particular polymer and then running standard ASTM tests such as tensile, elongation, oxygen bomb and weatherometer aging on test samples. In general, any amount of nitrophenyl hydrazone above 0.5 part per 100 parts of polymer will give some beneficial effects for deterioration resistance. More than about 10 parts will often be found to give less and less benefits for the additional material added and above this amount, the hydrazones may be incompatible with the base polymer. From 0.5 to 7.0 parts of dinitrophenyl hydrazone based on 100 parts of polymer usually gives beneficial results with 2.0 to 5.0 parts being most preferred.

I have found that dinitrophenyl hydrazones papear to be unique in providing the desired deterioration resistance for high polymer materials. When compounds containing other substituent groups, such as bromo, chloro, and carboxyl, in place of the nitro groups in the hydrazine moiety, were employed, the favorable results of the practice of my invention were not obtained.

Compounds illustrative of this new class of deterioration retarders include the 2,4-dinitrophenyl hydrazones of di-n-butyl ketone, phorone, acetophenone, benzophenone, 2-octanone, p,p'-dimethoxybenzophenone, palmitone, formaldehyde, acetaldehyde, acrolein, chloral, isopentaldehyde, heptaldehyde, citronellaldehyde, anisaldehyde, crotonaldehyde, tiglic aldehyde, benzaldehyde, meta-nitrobenzaldehyde, cinnamaldehyde, naphthaldehyde, anthraldehyde, glucose and galactose.

The dinitrophenyl hydrazone deterioration retarders of my invention are broadly compatible by standard mixing and milling techniques with a wide variety of high polymer materials including polyether and polyester urethanes, polyethylene, polypropylene, polyvinyl chloride, polyvinylidene chloride, polyacrylates, polymethacrylates. The term "high polymer" is intended to cover homopolymers, copolymers, terpolymers, interpolymers and the like. The polymers may be compounded with fillers and loading pigments, accelerators, vulcanizing agents, retarders, and the like and the nitrophenyl hydrazones of my invention are still compatible therewith through a range of 0.1 to 10.0 parts or more.

The following examples in which parts are by weight illustrate my invention:

EXAMPLE 1

A polyesterurethane polymer was prepared according to the teachings of United States Patent 2,871,218 by mixing 1447 grams (1.704 mols) of hydroxyl polytetramethylene adipate, molecular weight 849, hydroxyl number 130.4, and 109.6 grams (1.218 mols) of butanediol-1,4 in a kettle and stirring with a spiral ribbon stirrer for 20 minutes at a pressure of 5 to 6 mm. at 105° C. Next 730 grams (2.92 mols) of diphenyl methane-p,p'-diisocyanate were added and stirred into the mix for one minute. The reaction mass was then poured into a lubricated container, sealed with a friction top, and placed in a 140° C. oven for 3.5 hours. A clear, snappy elastomer was obtained.

One portion of the polyesterurethane polymer was maintained as a control. Other portions were mill-mixed with varying amounts of several 2,4-dinitrophenyl hydrazones. Micro tensile, 300% modulus and elongation were measured at the time the samples were prepared and at one month intervals over a period of one year while the samples were subjected to continuous outdoor weatherings by exposing 25 mil micro dumbbells mounted at a 45° angle in a unshielded position facing south. A summary of the test results is given in Table 1A. The A columns list data on the samples as originally prepared; B columns list similar figures after the samples have weathered for one year. The column headed "Percent retention" following the tensile strength comparison indicates the percent of original tensile strength still retained by the sample after the test period. If at least 50 percent of the original tensile strength is retained after 1 year of outdoor weathering, the age resister is doing its job. Furthermore, the sample should not develop any visible cracks, or at the most, only small ones no larger than hairline in width and of no appreciable depth. Samples were examined visually for cracks and arbitrarily rated as follows:

n—no cracks
vvs—very, very small cracks
vs—very small cracks
s—small cracks
m—medium cracks
l—large cracks Some compounded elastomer samples were exposed to another severe test, one week exposure under dry conditions in an Atlas Twin Arc Weather-Ometer, type HVDLX. These test data are shown in Table 1B. As in the outdoor tests, if the sample retains 50% or more of its original tensile strength after one week in the weatherometer, the age resister is doing a good job. When viewed by the naked eye, the samples should not have developed more than very slight surface cracks.

*Table 1A*

| 2,4 dinitrophenylhydrazone | Conc., ph. | Tensile strength, p.s.i. | | Percent retention | 300% modulus, p.s.i. | | Elongation, percent | | Cracks developed |
|---|---|---|---|---|---|---|---|---|---|
| | | A | B | | A | B | A | B | |
| Iso-pentaldehyde | 0.0 | 7,600 | 1,800 | 23.7 | 1,600 | 1,600 | 525 | 350 | l |
| | 1.0 | 8,800 | 5,800 | 65.9 | 1,600 | 1,400 | 525 | 575 | s |
| | 2.0 | 8,900 | 7,400 | 83.2 | 1,700 | 1,400 | 510 | 600 | vs |
| | 5.0 | 9,000 | 7,400 | 82.3 | 1,400 | 1,400 | 550 | 600 | n |
| 2-octanone | 0.0 | 7,000 | 2,200 | 31.4 | 2,800 | -------- | 550 | 200 | m |
| | 0.5 | 8,600 | 5,800 | 67.4 | 2,200 | 2,000 | 500 | 500 | s |
| | 1.0 | 9,000 | 6,400 | 71.2 | 2,400 | 2,000 | 575 | 510 | s |
| | 2.0 | 10,000 | 7,200 | 72.0 | 1,900 | 1,800 | 575 | 550 | vs |
| | 5.0 | 9,000 | 7,100 | 78.8 | 1,900 | 1,400 | 600 | 600 | n |
| Crotonaldehyde | 0.0 | 6,200 | 1,900 | 30.6 | 1,000 | 1,400 | 650 | 450 | m |
| | 1.0 | 6,000 | 4,400 | 73.4 | 1,600 | 1,100 | 700 | 675 | s |
| | 2.0 | 6,600 | 5,000 | 75.7 | 2,000 | 1,100 | 625 | 675 | n |
| | 5.0 | 7,000 | 4,800 | 68.7 | 2,000 | 1,100 | 650 | 675 | n |
| Benzophenone | 0.5 | 6,700 | 2,400 | 35.8 | 1,600 | 1,000 | 650 | 600 | m |
| | 1.0 | 7,100 | 3,200 | 45.1 | 1,100 | 800 | 700 | 625 | s |
| | 5.0 | 7,100 | 3,600 | 50.7 | 1,200 | 800 | 625 | 700 | s |

Table 1B

| 2,4 dinitrophenylhydrazone | Conc., ph. | Tensile strength, p.s.i. | | Percent retention | 300% modulus, p.s.i. | | Elongation, percent | | Cracks developed |
|---|---|---|---|---|---|---|---|---|---|
| | | A | B | | A | B | A | B | |
| Benzophenone | 0.0 | 6,600 | 600 | 9.1 | 1,600 | | 700 | 100 | m |
| | 1.0 | 5,000 | 4,500 | 90.0 | 1,000 | 1,200 | 625 | 700 | s |
| | 2.0 | 6,800 | 5,800 | 85.4 | 1,100 | 1,200 | 700 | 800 | vs |
| | 5.0 | 4,800 | 4,000 | 83.4 | 800 | 1,100 | 700 | 725 | vvs |
| Benzaldehyde | 0.0 | 6,800 | 1,200 | 17.7 | 1,600 | | 575 | 125 | m |
| | 1.0 | 7,800 | 6,000 | 76.9 | 1,700 | 1,800 | 600 | 600 | vvs |
| | 2.0 | 8,600 | 7,500 | 87.3 | 1,300 | 1,800 | 625 | 625 | vvs |
| | 5.0 | 8,400 | 6,000 | 71.5 | 1,600 | 1,900 | 575 | 625 | n |
| Glucose-2,4-dinitro phenyl hydrazone phenyl isocyanate reaction product | 5.0 | 7,800 | 6,000 | 77.0 | 1,000 | 1,400 | 525 | 600 | vvs |
| | 10.0 | 7,200 | 5,600 | 77.8 | 1,200 | 1,200 | 525 | 700 | vvs |
| Crotonaldehyde | 1.0 | 9,600 | 5,600 | 58.3 | 2,000 | 1,800 | 400 | 510 | s |
| Citronellaldehyde | 1.8 | 9,600 | 6,800 | 71.8 | 1,700 | 1,800 | 535 | 600 | vs |

EXAMPLE 2

A polyether urethane casting composition was prepared by reacting 0.017 mol of Teracol 30 (a hydroxy-polytetramethylene oxide), 0.025 mol p-phenylene diisocyanate (pPDI) and 0.004 mol of trimethylolpropane in a glass flask equipped with stirrer, thermometer, vacuum connection and heating collar. The Teracol 30 was dried under vacuum at 100° C. Paraphenylene diisocyanate was added at 100° C. and the mixture was stirred 15 minutes. Finally, the glycol was added, stirred for 8 minutes under vacuum, and the polymer mix was cast into closed curing molds and held for 16 hours at 130° C. The Teracol had a molecular weight of 2950, a hydroxyl number of 37.7, and an acid number of 0.1.

When a 2,4-dinitrophenyl hydrazone was to be incorporated, it was added before the glycol addition and in all cases mixed readily into the polymer mass. A control and test samples were placed in the weatherometer for one week. Test data are listed in Table 2A. Column A lists results on freshly prepared samples; column B lists the comparable data after one week in the weatherometer.

Another control and test samples were cut in the form of micro dumbbells and hung in a 130° C. oven. At intervals, samples were removed and tested. Data are presented in Table 2B. Under these severe conditions the age resister is doing a remarkable job if it enables the sample to retain any strength after 24 hours. It is observed that unprotected control samples melt completely away in less than 24 hours.

prepared by drying 100 parts Teracol 30 at 100° C. and 2 mm. Hg for one hour, then adding 9 parts pPDI and degassing. Next 1 part 1,4-butanediol, 0.35 part of potassium acetate, and 2 parts of 2-octanone-2,4-dinitrophenylhydrazone were added and the mixture was again degassed. The polymer mass was then poured into micro tensile sheet molds and cured for 16 hours at 130° C. Control and test samples were exposed in the weatherometer for one week. The Teracol 30 had a molecular weight of 3000 and a hydroxyl number of 37.5.

Table 3

| 2,4-dinitrophenyl-hydrazone | Tensile strength p.s.i. | | Percent retention | 300% modulus p.s.i. | | Elongation percent | |
|---|---|---|---|---|---|---|---|
| | A | B | | A | B | A | B |
| Control | 6,000 | (1) | 0 | 800 | | 800 | |
| 2-octanone | 6,000 | 6,000 | 100 | 800 | 700 | 800 | 1,100 |

[1] Melted to soft wax.

EXAMPLE 4

Various 2,4-dinitrophenyl hydrazones were mixed with a polyvinylchloride resin by mill mixing 30 parts of polyvinylchloride and 15 parts of a plasticizer, di-octyl phthalate, and then adding the desired amount of age-resister based on the parts of resin present. The resin and plasticizer formed a homogeneous mass on the mill Table 2A

| 2,4 dinitrophenylhydrazone | Conc., ph. | Tensile strength, p.s.i. | | Percent retention | 300% modulus, p.s.i. | | Elongation, percent | | Cracks developed |
|---|---|---|---|---|---|---|---|---|---|
| | | A | B | | A | B | A | B | |
| Control | 0.0 | 3,700 | (1) | 0.0 | 400 | | 700 | | |
| Isopentaldehyde | 2.0 | 3,000 | 1,000 | 33.3 | 200 | | 610 | 690 | s |
| Chloral | 2.0 | 3,600 | 2,400 | 66.7 | 400 | 200 | 700 | 625 | vs |
| 2-octanone | 1.7 | 2,600 | 2,000 | 76.9 | 200 | 160 | 600 | 675 | s |

[1] Melted away in 1 day.

Table 2B

| 2,4-dinitrophenyl hydrazone | Conc. ph. | Hours in oven | Tensile strength, p.s.i. | Percent retention | 300% modulus | Elongation, percent |
|---|---|---|---|---|---|---|
| Control | 0.0 | 0 | 3,700 | (1) | 400 | 400 |
| 2-octanone | 2.0 | 0 | 6,400 | | 800 | 800 |
| Do | 2.0 | 72 | 2,200 | 34.4 | 500 | 500 |
| Do | 2.0 | 168 | 400 | 6.3 | 400 | 300 |

[1] Melted in 8 hours.

EXAMPLE 3

Another polyether urethane casting composition was and the various 2,4-dinitrophenylhydrazones all milled into the batches very readily.

Table 4A lists the various test data obtained in the Atlas weatherometer. Table 4B shows similar results obtained with samples exposed to outdoor weathering conditions for one year.

A distinguishing characteristic of unprotected plasticized vinyl resins is that they tend to darken, spot, and discolor very quickly. The control sample employed here in weatherometer testing showed the appearance of small black spots in 66 hours and was completely black in 176 hours.

At 1.0 p.h.r. crotonaldehyde-2,4-dinitrophenylhydrazone, the first spot did not appear for 198 hours. Benzophenone-2,4-dinitrophenylhydrazone at 1.0 p.h.r. gave complete protection against spotting for 220 hours. With 1.0 p.h.r. chloral-2,4-dinitrophenylhydrazone after 198 hours some spotting of the sample was observed.

When the 2,4-dinitrophenylhydrazones of 2-octanone, benzaldehyde and p-hydroxybenzaldehyde were similarly compounded with polyvinylchloride resin, test samples showed very little darkening or spotting after 110 hours' exposure in the weatherometer.

EXAMPLE 5

Several phenylhydrazones were prepared according to the procedure of Shriner and Fuson except that the nitro groups in 2,4-dinitrophenylhydrazines were first replaced by alternate substituent radicals or shifted to other positions on the ring or removed entirely. These phenylhydrazones were compounded in the regular manner with the polyesterurethane polymer of Example 1. Results are summarized in Table 6A. Nitrobenzene and dinitrobenzene were also included for comparison of the phenyl Table 4A

| 2,4-dinitrophenylhydrazone | Conc. ph. | Tensile strength, p.s.i. A | Tensile strength, p.s.i. B | Percent retention | 300% modulus, p.s.i. A | 300% modulus, p.s.i. B | Elongation, percent A | Elongation, percent B | Time, hours |
|---|---|---|---|---|---|---|---|---|---|
| Control | 0.0 | 3,500 | (¹) | 0.0 | 300 | | | | 198 |
| Crotonaldehyde | 1.0 | 2,900 | 1,000 | 34.5 | 2,900 | | 300 | 25 | 220 |
| Benzophenone | 1.0 | 3,200 | 3,000 | 93.8 | 3,200 | | 300 | 125 | 220 |
| Chloral | 1.0 | 3,800 | 2,900 | 76.4 | 3,600 | | 325 | 125 | 198 |
| | 3.0 | 3,200 | 4,200 | 131.0 | 2,900 | | 335 | 50 | 308 |
| | 5.0 | 3,300 | 5,400 | 163.8 | 3,000 | | 325 | 15 | 308 |

¹ Too brittle to test.

Table 4B

OUTDOOR EXPOSURE (12 MONTHS)

| 2,4-dinitrophenylhydrazone | Conc. ph. | Tensile strength, p.s.i. A | Tensile strength, p.s.i. B | Percent retention | 300% modulus, p.s.i. A | 300% modulus, p.s.i. B | Elongation, percent A | Elongation, percent B |
|---|---|---|---|---|---|---|---|---|
| Chloral | 0.0 | 3,500 | 1,800 | 51.0 | 300 | | 325 | 100 |
| | 1.0 | 3,800 | 2,700 | 71.0 | 3,600 | | 325 | 210 |
| | 3.0 | 3,300 | 3,300 | 100.0 | 3,100 | 3,300 | 325 | 300 | ring with the 2,4-dinitrophenylhydrazone structure. These results are shown in Table 6B. Initial data and data taken after 1 week in the weatherometer are listed in Tables 6A and 6B.

These data show that (1) the phenylhydrazone structure gives results superior to the phenyl structure, (2) that nitro substituent groups give better results than other substituent radicals and (3) that better results are obtained when the nitro groups are in the 2 and 4 position on the phenyl ring in the phenylhydrazone structure.

Table 6A

| Phenylhydrazone | Conc., ph. | Tensile strength, p.s.i. A | Tensile strength, p.s.i. B | Percent retention | 300% modulus, p.s.i. A | 300% modulus, p.s.i. B | Elongation, percent A | Elongation, percent B | Cracks developed |
|---|---|---|---|---|---|---|---|---|---|
| Croton aldehyde-p-nitrophenyl hydrazone | 0.5 | 9,000 | 2,000 | 22.2 | 2,000 | 1,400 | 600 | 400 | l |
| | 1.0 | 8,200 | 4,000 | 48.7 | 1,600 | 1,700 | 600 | 500 | l |
| Benzaldehyde-2,4-dichlorophenylhydrazone | 0.5 | 8,000 | 1,300 | 16.2 | 1,200 | | 575 | 225 | l |
| | 1.0 | 8,400 | 1,800 | 21.4 | 1,200 | 1,400 | 600 | 375 | l |
| | 2.0 | 8,500 | 2,800 | 32.9 | 1,400 | 1,500 | 575 | 450 | l |
| | 5.0 | 9,200 | 3,700 | 40.3 | 1,400 | 1,700 | 600 | | m |
| Benzaldehyde-2,5-dichlorophenylhydrazone | 0.5 | 9,300 | 1,700 | 18.3 | 2,400 | 1,700 | 550 | 300 | l |
| | 1.0 | 9,100 | 2,200 | 24.2 | 2,700 | 1,800 | 550 | 375 | l |
| | 2.0 | 9,100 | 2,300 | 25.2 | 2,700 | 1,700 | 550 | 400 | l |
| | 5.0 | 9,500 | 3,800 | 40.1 | 2,200 | 1,800 | 600 | 500 | m |
| Benzaldehyde-p-carboxyphenylhydrazone | 0.5 | 10,400 | 1,600 | 15.4 | 2,600 | 1,600 | 500 | 225 | l |
| | 1.0 | 9,000 | 1,500 | 16.7 | 2,400 | 1,500 | 575 | 300 | l |
| | 2.0 | 9,900 | 2,200 | 24.5 | 2,800 | 1,500 | 600 | 425 | l |
| | 5.0 | 9,200 | 3,400 | 36.9 | 2,300 | 1,500 | 600 | 525 | n |
| | 0.0 | 7,200 | 2,600 | 36.1 | 2,400 | 3,600 | 500 | 400 | |
| Benzophenonephenylhydrazone | 0.1 | 7,600 | 2,000 | 26.4 | 2,000 | 3,100 | 525 | 400 | |
| | 1.0 | 8,000 | 2,500 | 31.3 | 2,400 | 2,600 | 425 | 525 | |

Table 6B

| Benzene | Conc., ph. | Tensile strength, p.s.i. A | Tensile strength, p.s.i. B | Percent retention | 300% modulus, p.s.i. A | 300% modulus, p.s.i. B | Elongation, percent A | Elongation, percent B | Cracks developed |
|---|---|---|---|---|---|---|---|---|---|
| Nitro | 2.0 | 8,700 | 1,600 | 18.4 | 2,000 | | 575 | 200 | l |
| | 5.0 | 8,000 | 2,000 | 25.0 | 1,900 | 1,700 | 575 | 325 | l |
| Dinitro | 2.0 | 8,000 | 4,200 | 52.4 | 1,800 | 1,800 | 600 | 500 | l |

It is seen that the 2,4-dinitrophenyl hydrazones comprise a class of extremely valuable age resisters for rubbery and resinous high polymers. These materials are highly compatible with the various types of polymers. They can be mill-mixed with millable polymers or mixed by mutual solvent techniques. They protect the physical properties of the polymers under extreme weathering conditions for long periods of time.

I claim:

The combination comprising a mixture of 100 parts of a polymer selected from the group consisting of polyurethanes, polyethylene, polypropylene, polyvinylchloride, polyvinylidene chloride and polyacrylates with from 0.5 to 10.0 parts of a 2,4-dinitrophenyl hydrazone of the formula

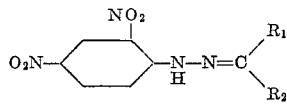

wherein $R_1$ is selected from the group consisting of hydrogen, alkyl radicals containing 1 to 15 carbon atoms, phenyl, phenylmethoxy, and benzyl and $R_2$ is selected from the group consisting of hydrogen, alkyl radicals containing 1 to 15 carbon atoms, alkene radicals containing ethylenic unsaturation and up to 9 carbon atoms, aryl radicals containing from 1 to 3 structural rings of carbon atoms, and sugar aldehydes selected from the class consisting of glucose and galactose, and any of the said structures for $R_1$ and $R_2$ except hydrogen itself may have any reactive hydrogen replaced by another substituent group selected from the class consisting of halogen, nitro, hydroxyl, carboxyl, cyano, alkyl radicals containing 1 to 4 carbon atoms, and alkoxy radicals containing 1 to 4 carbon atoms.

References Cited in the file of this patent

UNITED STATES PATENTS

| | | |
|---|---|---|
| 2,018,645 | Williams et al. | Oct. 22, 1935 |
| 2,044,800 | Major et al. | June 23, 1936 |
| 2,067,299 | Williams et al. | Jan. 12, 1937 |
| 2,165,525 | Youker | July 11, 1939 |
| 2,786,044 | Warner et al. | Mar. 19, 1957 |

FOREIGN PATENTS

| | | |
|---|---|---|
| 552,448 | Canada | Jan. 28, 1958 |